US011993922B2

(12) United States Patent
Otani et al.

(10) Patent No.: US 11,993,922 B2
(45) Date of Patent: May 28, 2024

(54) REMOTE OPERATION SYSTEM

(71) Applicant: KOBELCO CONSTRUCTION MACHINERY CO., LTD., Hiroshima (JP)

(72) Inventors: Masaki Otani, Hiroshima (JP); Hitoshi Sasaki, Hiroshima (JP); Seiji Saiki, Hiroshima (JP); Yoichiro Yamazaki, Hiroshima (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 368 days.

(21) Appl. No.: 17/438,624

(22) PCT Filed: Dec. 2, 2019

(86) PCT No.: PCT/JP2019/047069
§ 371 (c)(1),
(2) Date: Sep. 13, 2021

(87) PCT Pub. No.: WO2020/194883
PCT Pub. Date: Oct. 1, 2020

(65) Prior Publication Data
US 2022/0220706 A1 Jul. 14, 2022

(30) Foreign Application Priority Data
Mar. 26, 2019 (JP) ................. 2019-058105

(51) Int. Cl.
*E02F 9/26* (2006.01)
*E02F 9/20* (2006.01)
*G05D 1/00* (2024.01)

(52) U.S. Cl.
CPC .............. *E02F 9/262* (2013.01); *E02F 9/205* (2013.01); *E02F 9/265* (2013.01); *G05D 1/0038* (2013.01)

(58) Field of Classification Search
CPC . E02F 9/262; E02F 9/205; E02F 9/265; E02F 9/261; E02F 9/264; E02F 3/3668;
(Continued)

(56) References Cited

U.S. PATENT DOCUMENTS

| 5,855,553 A | 1/1999 | Tajima et al. |
| 2002/0049510 A1 | 4/2002 | Oda et al. |

(Continued)

FOREIGN PATENT DOCUMENTS

| CN | 101971112 A | 2/2011 |
| JP | H08-215211 A | 8/1996 |

(Continued)

OTHER PUBLICATIONS

Office Action dated Jan. 12, 2024 issued in the corresponding Chinese Patent Application No. 201980094288.4 with an English machine translation thereof.

*Primary Examiner* — Abby Y Lin
*Assistant Examiner* — Esvinder Singh
(74) *Attorney, Agent, or Firm* — Carrier, Shende & Associates P.C.; Joseph P Carrier; Jeffrey T. Gedeon

(57) ABSTRACT

Provided is a system which can supply appropriate information to one operator from a viewpoint that the one operator grasps a remotely operational mode for a working machine by the other operator. In a first remote operation apparatus 10, a passive mode detector 112 detects a passive mode of a first operation mechanism 111, and transmits operational mode data corresponding to the passive mode. In a second remote operation apparatus 20, an operation of an actuator 212 is controlled in accordance with the passive mode of the first operation mechanism 111 in response to the operational mode data, and thereby, a second operation mechanism 211 actively operates.

4 Claims, 7 Drawing Sheets

(58) Field of Classification Search
CPC ..... E02F 9/2004; E02F 9/2025; E02F 9/2012; G05D 1/0038; G05D 2201/0202; G05D 1/0033; G05D 1/0011; H04Q 9/00; H04Q 9/02; H04Q 9/04; G08C 2201/30; G08C 17/00; G05B 2219/31457; G05B 2219/40174; G05B 2219/40184; G05B 2219/36184

See application file for complete search history.

(56) References Cited

U.S. PATENT DOCUMENTS

| | | | |
|---|---|---|---|
| 2010/0302359 A1* | 12/2010 | Adams | H04L 1/0014 |
| | | | 375/240.01 |
| 2012/0041588 A1 | 2/2012 | Niinomi et al. | |
| 2019/0048560 A1 | 2/2019 | Misaki | |
| 2020/0264604 A1* | 8/2020 | Tao | H04W 12/03 |
| 2020/0399869 A1* | 12/2020 | Yoshinada | E02F 9/205 |
| 2021/0017003 A1* | 1/2021 | Yamauchi | B66C 13/46 |
| 2021/0381203 A1* | 12/2021 | Itoh | H04N 7/181 |

FOREIGN PATENT DOCUMENTS

| | | |
|---|---|---|
| JP | 2002-272758 A | 9/2002 |
| JP | 2016-039575 A | 3/2016 |
| JP | 2016-076801 A | 5/2016 |
| JP | 2017-022433 A | 1/2017 |
| JP | 2019-010724 A | 1/2019 |
| WO | 2017/183707 A1 | 10/2017 |

\* cited by examiner

REMOTE OPERATION SYSTEM

TECHNICAL FIELD

The present invention relates to a system for remote operation of a working machine or the like.

BACKGROUND ART

A technology of remotely operating a working machine is suggested (see, e.g., Patent Literature 1).

CITATION LIST

Patent Literature

Patent Literature 1: Japanese Patent Laid-Open No. 2016-076801

SUMMARY OF INVENTION

Technical Problem

It is preferable to allow one operator who is less skilled in a remote operation of a working machine to grasp a remotely operational mode for a working machine by the other skilled operator from a viewpoint of improving the skill.

To solve the problem, an object of the present invention is to provide a system which can provide appropriate information to one operator from a viewpoint of allowing the one operator to grasp a remotely operational mode for a working machine by the other operator.

Solution to Problem

The present invention provides a remote operation system comprising: a working machine including an actuation mechanism and an imaging device which images environment including at least a part of the actuation mechanism; and a first remote operation apparatus and a second remote operation apparatus each including an operation mechanism configured to perform a remote operation of the working machine and an image display device which displays an environmental image corresponding to captured image data acquired by the imaging device of the working machine, wherein the first remote operation apparatus comprises a passive mode detector which detects a passive mode of the operation mechanism, and a first client control device which transmits operational mode data corresponding to the passive mode of the operation mechanism which is detected by the passive mode detector, and the second remote operation apparatus comprises an actuator configured to actively operate the operation mechanism, and a second client control device which receives the operational mode data, and controls an operation of the actuator in accordance with the passive mode of the operation mechanism in the first remote operation apparatus in response to the operational mode data.

The present invention provides a remote operation server having an intercommunicating function with each of a first remote operation apparatus and a second remote operation apparatus each including an operation mechanism configured to perform a remote operation of a working machine including an actuation mechanism and an imaging device which images environment including at least a part of the actuation mechanism, and an image display device which displays an environmental image corresponding to captured image data acquired by the imaging device of the working machine, the remote operation server comprising: a first server control element which receives, from the first remote operation apparatus, operational mode data corresponding to a passive mode of the operation mechanism which is detected in the first remote operation apparatus; and a second server control element which transmits the operational mode data to the second remote operation apparatus, to control an operation of an actuator configured to actively operate the operation mechanism in accordance with the passive mode of the operation mechanism in response to the operational mode data in the second remote operation apparatus.

DESCRIPTION OF EMBODIMENTS (Configuration)

Figure 1:
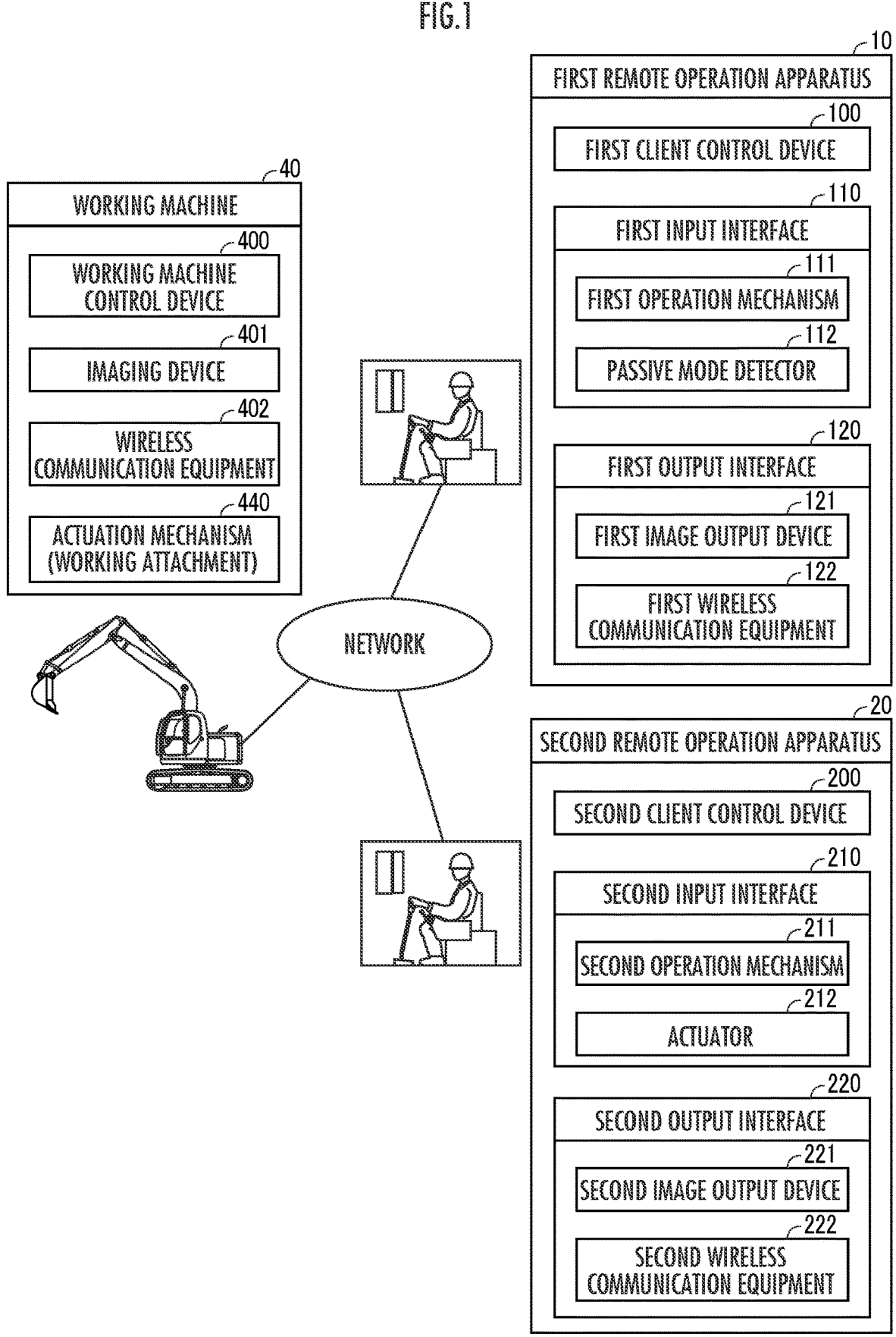
FIG. 1 is an explanatory view concerning a configuration of a remote operation system according to an embodiment of the present invention.

A remote operation system as an embodiment of the present invention shown in FIG. 1 comprises a first remote operation apparatus 10, a second remote operation apparatus 20, and a working machine 40. A remote operation main body of the common working machine 40 is switchable between first remote operation apparatus 10 and the second remote operation apparatus 20.

(Configuration of Working Machine)

The working machine 40 comprises a working machine control device 400, an imaging device 401 (an outer imaging device), wireless communication equipment 402 and an actuation mechanism 440. The working machine control device 400 is constituted of an arithmetic processing device (a single core processor or a multicore processor or a processor core forming this processor), and reads required data and software from a storage device such as a memory, to execute arithmetic processing of the data as an object in accordance with the software.

Figure 2:
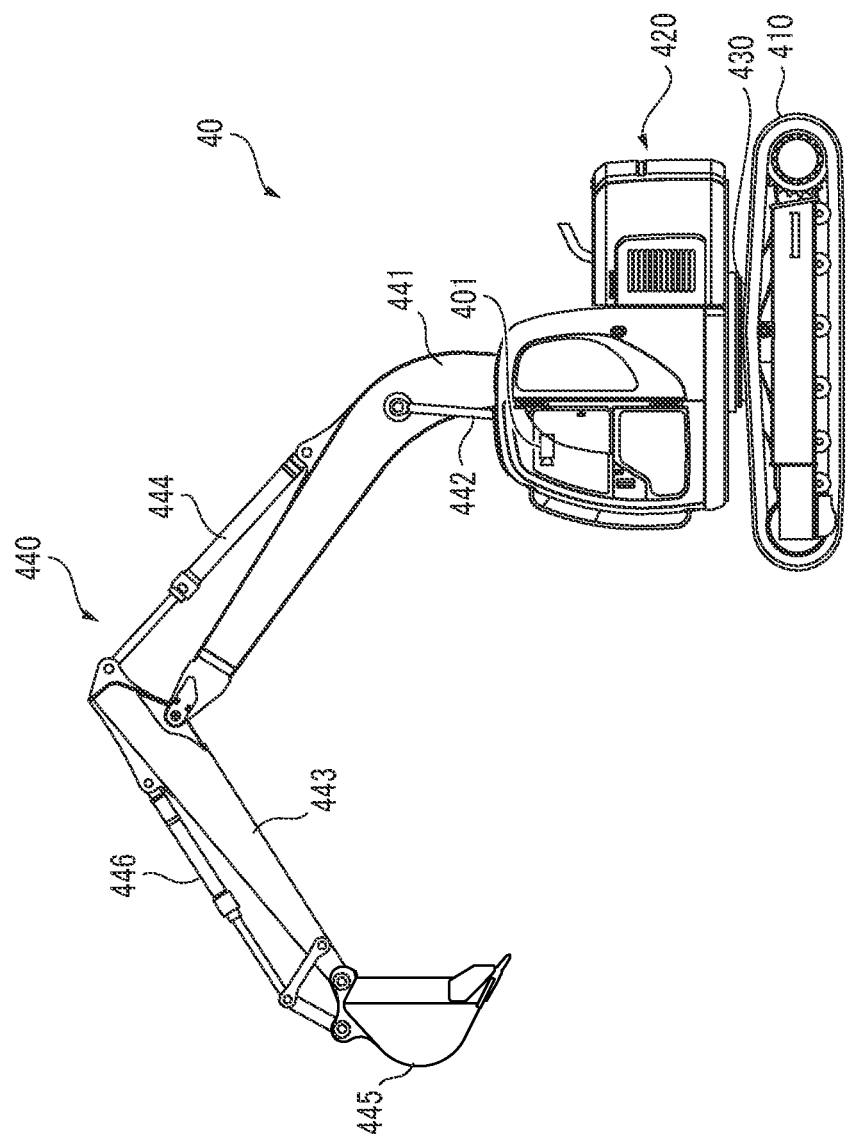
FIG. 2 is an explanatory view concerning a configuration of a working machine.

The working machine 40 is, for example, a crawler excavator (a construction machine), and comprises a crawler type of lower running body 410, and an upper rotation body 420 rotatably mounted on the lower running body 410 via a rotation mechanism 430 as shown in FIG. 2. A cab (driver's cab) 422 is disposed in a front left part of the upper rotation body 420. The working attachment 440 is disposed in a front central part of the upper rotation body 220.

The working attachment 440 as the actuation mechanism comprises a boom 441 capable of rising when mounted to the upper rotation body 420, an arm 443 rotatably coupled to a tip end of the boom 441, and a bucket 445 rotatably coupled to a tip end of the arm 443. A boom cylinder 442 constituted of a telescopic hydraulic cylinder, an arm cylinder 444 and a bucket cylinder 446 are mounted to the working attachment 440.

The boom cylinder 442 is interposed between the boom 441 and the upper rotation body 420 to receive supply of hydraulic oil, thereby expand and contract and rotate the boom 441 in a rising direction. The arm cylinder 444 is interposed between the arm 443 and the boom 441 to receive supply of hydraulic oil, thereby expand and contract and rotate the arm 443 relative to the boom 441 about a horizontal axis. The bucket cylinder 446 is interposed between the bucket 445 and the arm 443 to receive supply of hydraulic oil, thereby expand and contract and rotate the bucket 445 relative to the arm 443 about the horizontal axis.

The imaging device 401 is installed, for example, in the cab 422, and environment including at least a part of the actuation mechanism 440 is imaged through a front window of the cab 422.

The cab 422 is provided with an actual machine-side operation lever corresponding to an operation lever (described later) forming the first remote operation apparatus 10, and a drive mechanism or a robot which receives, from a remote operation room, a signal in response to an operational mode of each operation lever, and moves the actual machine operation lever based on the received signal.

(Configuration of First Remote Operation Apparatus)

The first remote operation apparatus 10 comprises a first client control device 100, a first input interface 110, and a first output interface 120. The first client control device 100 is constituted of an arithmetic processing device (a single core processor or a multicore processor or a processor core forming this processor), and reads required data and software from a storage device such as a memory, to execute arithmetic processing of the data as an object in accordance with the software. The first input interface 110 comprises a first operation mechanism 111 and a passive mode detector 112. The first output interface 120 comprises a first image output device 121 and first wireless communication equipment 122.

The first operation mechanism 111 includes a running operation device, a rotating operation device, a boom operation device, an arm operation device, and a bucket operation device. Each operation device includes an operation lever which receives a rotating operation. The operation lever (a running lever) of the running operation device is operated to move the lower running body 410. The running lever may serve also as a running pedal. For example, the running pedal fixed to a base or a lower end of the running lever may be disposed. An operation lever (a rotation lever) of the rotating operation device is operated to move a hydraulic rotation motor forming the rotation mechanism 430. An operation lever (a boom lever) of the boom operation device is operated to move the boom cylinder 442. An operation lever (an arm lever) of the arm operation device is operated to move the arm cylinder 444. An operation lever (a bucket lever) of the bucket operation device is operated to move the bucket cylinder 446.

Figure 3:
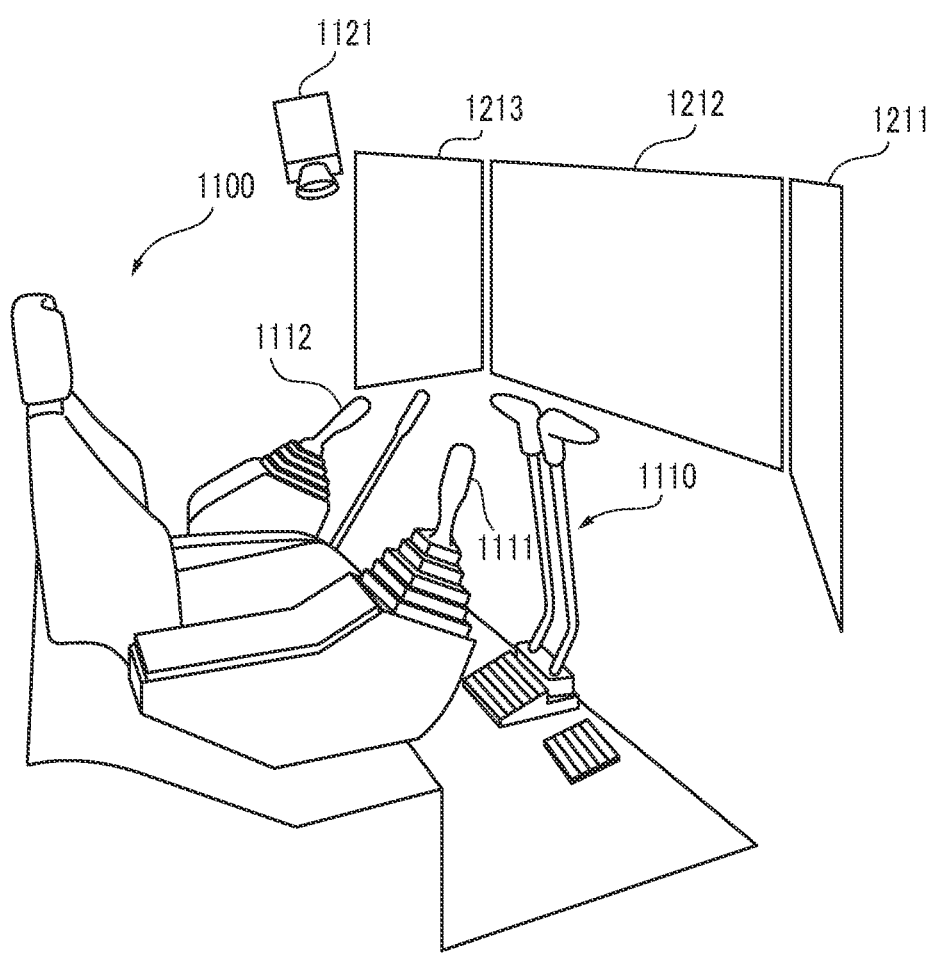
FIG. 3 is an explanatory view concerning a configuration of a first remote operation apparatus.

The respective operation levers forming the first operation mechanism 111 are arranged around a seat 1100 in which an operator is seated, for example, as shown in FIG. 3. The seat 1100 has, for example, a form of a high back chair with an arm rest, and may have an arbitrary form in which the operator can be seated, such as a form of a low back chair with no head rest, or a form of a chair with no backrest.

A pair of right and left running levers 1110 corresponding to right and left crawlers are laterally arranged side by side in front of the seat 1100. One operation lever may serve as a plurality of operation levers. For example, a right operation lever 1111 disposed in front of a right frame of the seat 1100 shown in FIG. 3 may function as the boom lever when operated in a front-rear direction and function as the bucket lever when operated in a right-left direction. Similarly, a left operation lever 1112 disposed in front of a left frame of the seat 1100 shown in FIG. 3 may function as the arm lever when operated in the front-rear direction, and function as the rotation lever when operated in the right-left direction. A lever pattern may be arbitrarily changed in response to an operators operation instruction.

For example, as shown in FIG. 3, the first image output device 121 is constituted of a right diagonally forward image output unit 1211, a front image output unit 1212 and a left diagonally forward image output unit 1213 arranged diagonally forward right, in front and diagonally forward left relative to the seat 1100. The image output units 1211 to 1213 may further comprise a speaker (a voice output unit).

The passive mode detector 112 is constituted of, for example, one or more imaging units 1121 (an inner imaging device) installed in the cab 422 so that the pair of running levers 1110, the right operation lever 1111 and the left operation lever 1112 fall in an imaging range.

The passive mode detector 112 may be formed from a sensor which outputs a signal in response to a deformation amount or a displacement amount of a biasing mechanism constituted of a spring or an elastic member which acts to restore the operation lever to an original position and posture corresponding to an operation amount 0, and an arithmetic processing device which presumes that the rotation lever is operated to rotate the upper rotation body 420 counterclockwise as seen from above at a certain speed based on the output signal of the sensor, and that the boom, the arm, the bucket or the like is operated.

The passive mode detector 112 may be formed from a pilot pressure sensor which outputs a signal in response to a pilot pressure corresponding to an operation amount of the actual machine-side operation lever, and an arithmetic processing device which presumes that the rotation lever is operated to rotate the upper rotation body 420 counterclockwise as seen from above at a certain speed based on the output signal of the pilot pressure sensor, and that the boom, the arm, the bucket or the like is operated.

(Configuration of Second Remote Operation Apparatus)

The second remote operation apparatus 20 comprises a second client control device 200, a second input interface 210, and a second output interface 220. The second client control device 200 is constituted of an arithmetic processing device (a single core processor or a multicore processor or a processor core forming this processor), and reads required data and software from a storage device such as a memory, to execute arithmetic processing of the data as an object in accordance with the software. The second input interface 210 comprises a second operation mechanism 211 and an actuator 212. The second output interface 220 comprises a second image output device 221 and second wireless communication equipment 222.

The actuator 212 is an actuator configured to actively drive the second operation mechanism 211, and constituted of a motorized, hydraulic or atmospheric pressure type of actuator. The other configuration of the second remote operation apparatus 20 is substantially similar to the configuration of the first remote operation apparatus 10 except that the passive mode detector 112 is omitted and except a function of the second client control device 200 which will be described later, and hence, description is omitted (see FIG. 3).

(Function)

Figure 4:
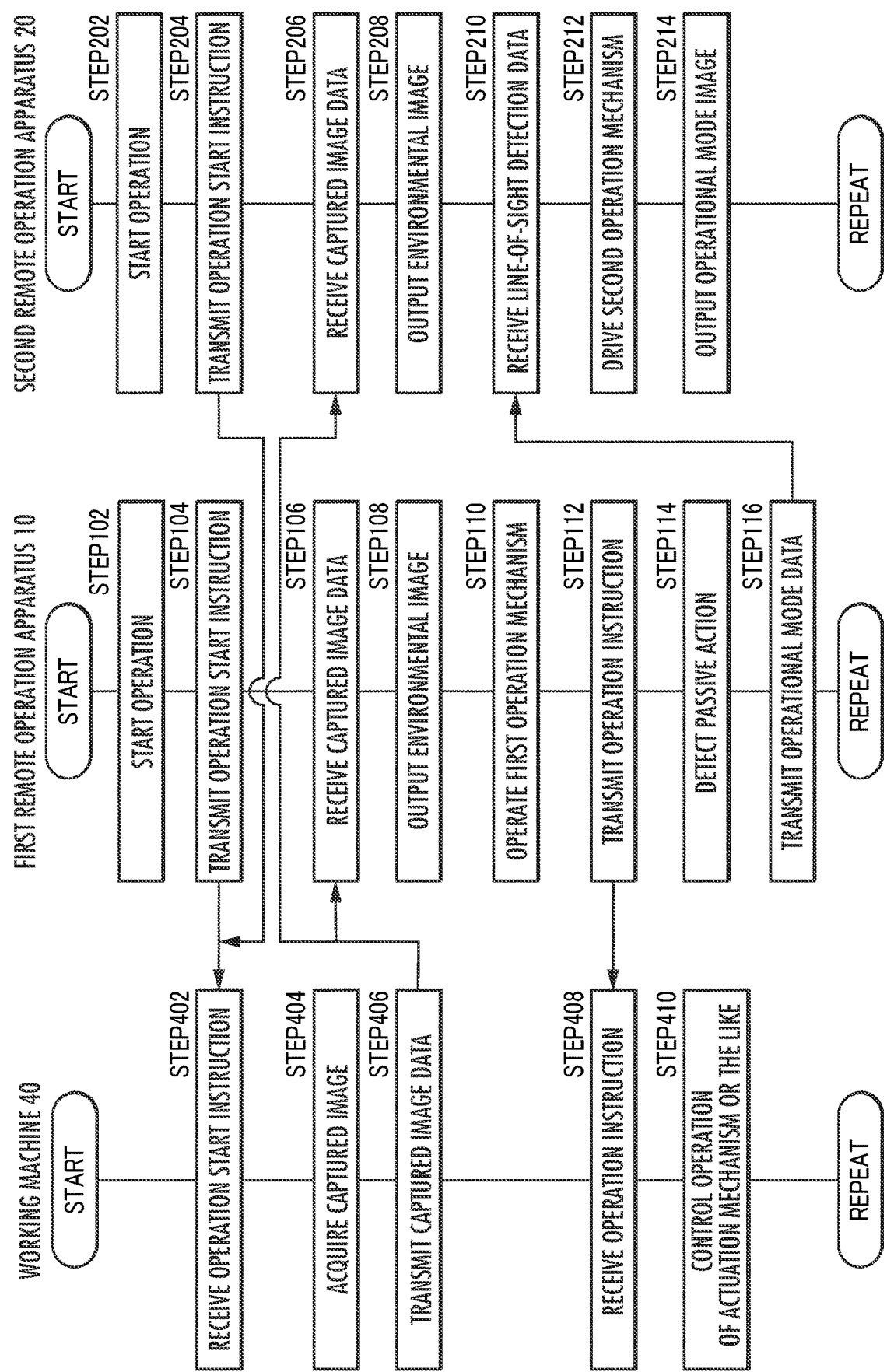
FIG. 4 is an explanatory view concerning a function of the remote operation system according to the embodiment of the present invention.

In the first remote operation apparatus 10, a first operator performs a predetermined operation (FIG. 4/STEP102). The predetermined operation is, for example, an operation of a button or an operation lever forming the first input interface 110 or the first operation mechanism 111. In response to this operation, the first client control device 100 transmits an operation start instruction from the first remote operation apparatus 10 to the working machine 40 through the first wireless communication equipment 122 (FIG. 4/STEP104).

Similarly, in the second remote operation apparatus 20, a second operator performs a predetermined operation (FIG. 4/STEP202). The predetermined operation is, for example, an operation of a button or an operation lever forming the second input interface 210 or the second operation mechanism 211. In response to this operation, the second client control device 200 transmits an operation start instruction from the second remote operation apparatus 20 to the working machine 40 through the second wireless communication equipment 222 (FIG. 4/STEP204).

In the working machine 40, the working machine control device 400 receives the operation start instruction through the wireless communication equipment 402 (FIG. 4/STEP402). In response to this operation, the working machine control device 400 outputs an instruction to the imaging device 401, and in response to the instruction, the imaging device 401 acquires captured image data (FIG. 4/STEP404). The working machine control device 400 transmits the captured image data representing a captured image to the first remote operation apparatus 10 and the second remote operation apparatus 20 through the wireless communication equipment 402 (FIG. 4/STEP406).

Figure 5A:
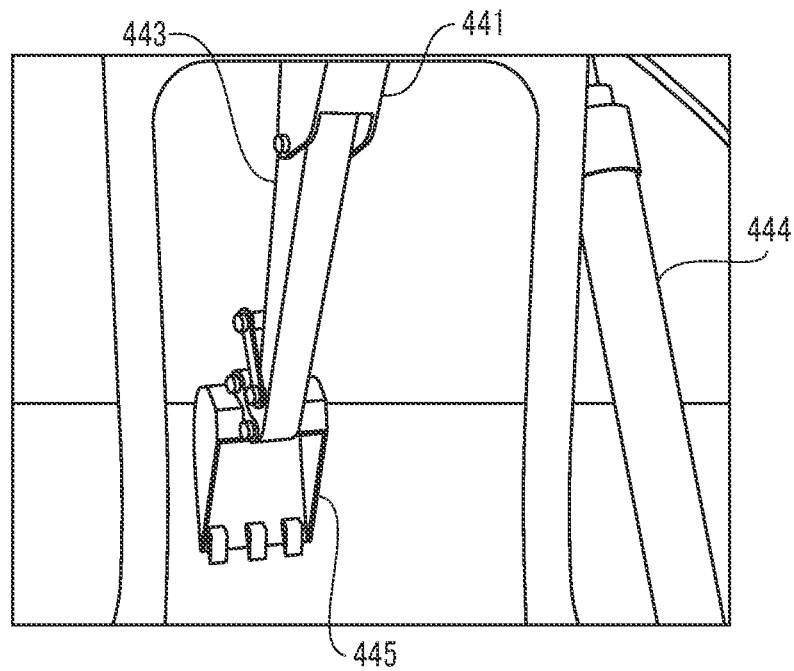
FIG. 5A is an explanatory view concerning an appearance of image output in a first image output device.

In the first remote operation apparatus 10, the first client control device 100 receives the captured image data through the first wireless communication equipment 122 (FIG. 4/STEP106). The first client control device 100 displays an environmental image corresponding to the captured image data (all or part of the captured image itself or a simulated environmental image generated based on this image) in the first image output device 121 (FIG. 4/STEP108). Similarly, in the second remote operation apparatus 20, the second client control device 200 receives the captured image data through the second wireless communication equipment 222 (FIG. 4/STEP206). The second client control device 200 displays the environmental image corresponding to the captured image data in the second image output device 221 (FIG. 4/STEP208). Consequently, for example, as shown in FIG. 5A, the environmental image including the boom 441, the arm 443, the bucket 445 and the arm cylinder 444 that are parts of the working attachment 440 as the actuation mechanism is displayed in each of the first image output device 121 and the second image output device 221.

In the first remote operation apparatus 10, the first operator operates the first operation mechanism 111 (FIG. 4/STEP110), and in response to this operation, the first client control device 100 transmits an operation instruction corresponding to the operational mode or pattern to the working machine 40 through the first wireless communication equipment 122 (FIG. 4/STEP112).

In the working machine 40, the working machine control device 400 receives an operation instruction through the wireless communication equipment 402 (FIG. 4/STEP408).

In response to this instruction, the working machine control device 400 controls the operation of the working attachment 440 or the like (FIG. 4/STEP410). For example, an operation of scooping soil in front of the working machine 40 with the bucket 445 and rotating the upper rotation body 420 to drop the soil from the bucket 445 is executed.

In the first remote operation apparatus 10, the passive mode detector 112 detects a passive mode or pattern of the first operation mechanism 111 by the operation of the first operator (FIG. 4/STEP114). The first client control device 100 transmits operational mode data corresponding to detection result of the passive mode to the second remote operation apparatus 20 through the first wireless communication equipment 122 (FIG. 4/STEP116).

In the second remote operation apparatus 20, the second client control device 200 receives the operational mode data through the second wireless communication equipment 222 (FIG. 4/STEP210). The second client control device 200 controls the operation of the actuator 212 in accordance with the operational mode data, and actively drives the second operation mechanism 211 (FIG. 4/STEP212). Consequently, an operational mode or passive mode of the first operation mechanism 111 by the first operator in the first remote operation apparatus 10 is reproduced as an active action of the second operation mechanism 211 in the second remote operation apparatus 20.

Figure 5B:
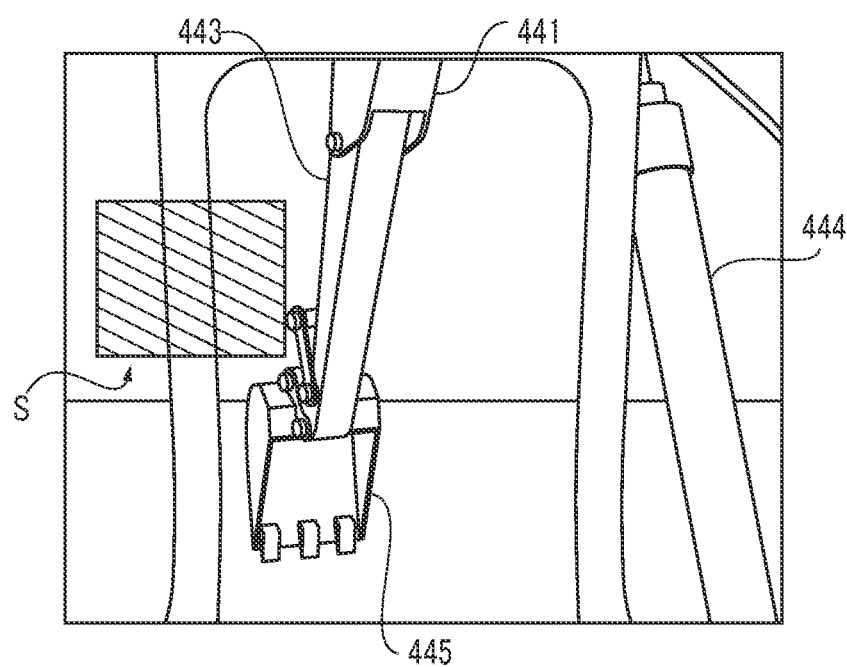
FIG. 5B is an explanatory view concerning an appearance of image output in a second image output device.

Furthermore, the second client control device 200 displays an operational mode image corresponding to the operational mode data in the second image output device 221 (FIG. 4/STEP214). Consequently, for example, as shown in FIG. 5B, an operational mode image S is superimposed on the environmental image including the boom 441, the arm 443, the bucket 445 and the arm cylinder 444 which are the parts of the working attachment 440 as the actuation mechanism, and displayed in the second image output device 221.

The operational mode image may be displayed at a position off the environmental image. For example, the environmental image is displayed in the front image output unit 1212, and the operational mode image is displayed in the right diagonally forward image output unit 1211 or the left diagonally forward image output unit 1213 (see FIG. 3). Thus, the environmental image and the operational mode image may be displayed in separate image output units, respectively.

Figure 6A:
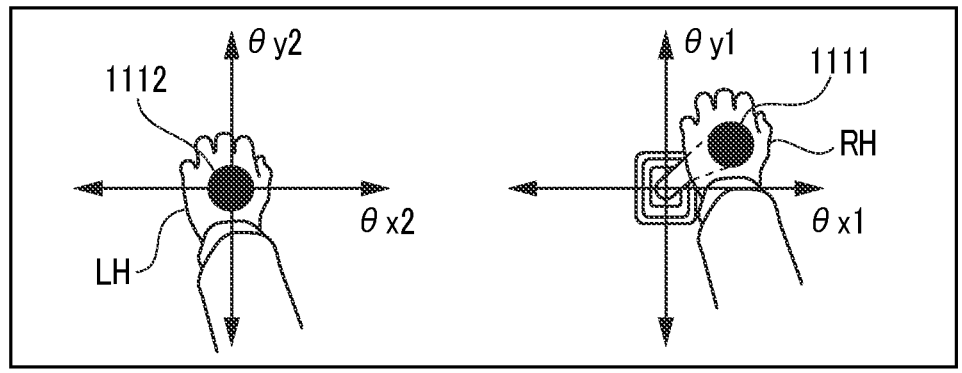
FIG. 6A is an explanatory view concerning a first example of an operational mode image.

For example, as shown in FIG. 6A, the operational mode image includes images of the right operation lever 1111 and a right hand RH of the first operator who moves this lever as seen from above, and images of the left operation lever 1112 and a left hand LH of the first operator who moves this lever as seen from above. The image may be generated by cutting out a part of the captured image acquired by the imaging device forming the passive mode detector 112, or may be a simulated image generated based on the captured image or the passive mode detection result. The operational mode image also includes an operational mode image representing each of numerical values of a tilt angle $\theta_{x1}$ back and forth and a tilt angle $\theta_{y1}$ to right and left from a reference state of the right operation lever 1111 and a tilt angle $\theta_{x2}$ back and forth as well as a tilt angle $\theta_{y2}$ to right and left from a reference state of the left operation lever 1112. Representation of the operation amount may be omitted from the operational mode image.

Figure 6B:
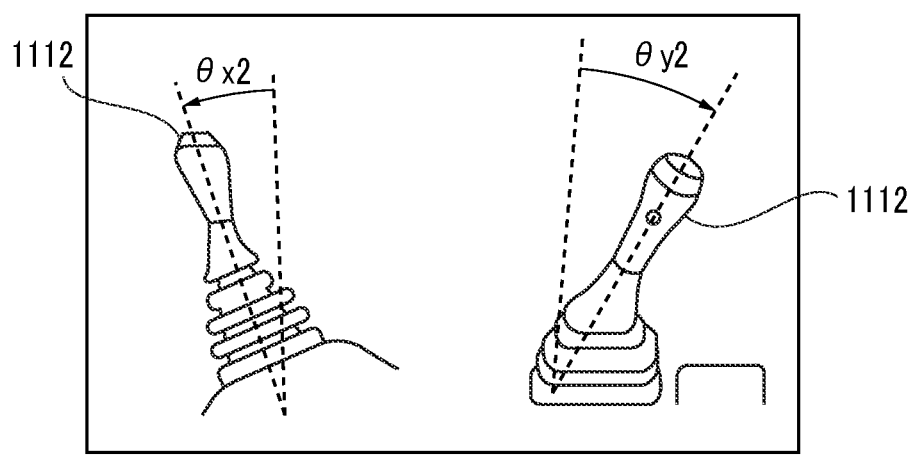
FIG. 6B is an explanatory view concerning a second example of the operational mode image.

As shown in FIG. 6B, images of the left operation lever 1112 seen from left and rear, respectively, are included in the operational mode image. The image may be generated by cutting out a part of the captured image corresponding to the captured image data acquired by the imaging device forming the passive mode detector 112, or may be a simulated image generated based on the captured image or the passive mode detection result. The operational mode image also includes the operational mode image representing each of the numerical values of the tilt angle $\theta_{x2}$ back and forth and the tilt angle $\theta_{y2}$ to right and left from the reference state of the left operation lever 1112. Similarly, images of the right operation lever 1111 seen from right and rear, respectively, may be included in the operational mode image. The representation of the operation amount may be omitted from the operational mode image.

(Effects)

According to the remote operation system of the configuration, as appropriate information from a viewpoint of allowing the second operator who operates the working machine 40 through the second remote operation apparatus 20 to grasp, through sense of touch, a remotely operational mode or pattern for the working machine 40 by the first operator who operates the working machine 40 through the first remote operation apparatus 10, i.e., the operational mode of the first operation mechanism 111, an active operational mode of the second operation mechanism 211 in the second remote operation apparatus 20 is supplied to the second operator (see FIG. 4/STEP212). The second operator holds the operation lever forming the second operation mechanism 211 with right or left hand in the same manner as in a case where the first operator holds the operation lever forming the first operation mechanism 111 with right or left hand, and thereby, the second operator can grasp movement of the operation lever through the hand, and recognize how to move the operation lever or the operational mode or pattern by the first operator.

Furthermore, as appropriate information from a viewpoint of allowing the second operator to visually grasp the operational mode of the first operation mechanism 111 by the first operator, the operational mode image representing the operational mode and operation amount of the first operation mechanism 111 by the first operator is supplied to the second operator (see FIG. 4/STEP214, FIG. 6A and FIG. 6B). The second operator can recognize how to move the operation lever or the operational mode by the first operator through visual recognition of the operational mode image displayed in the second image output device 221.

Another Embodiment of the Present Invention

Figure 7:
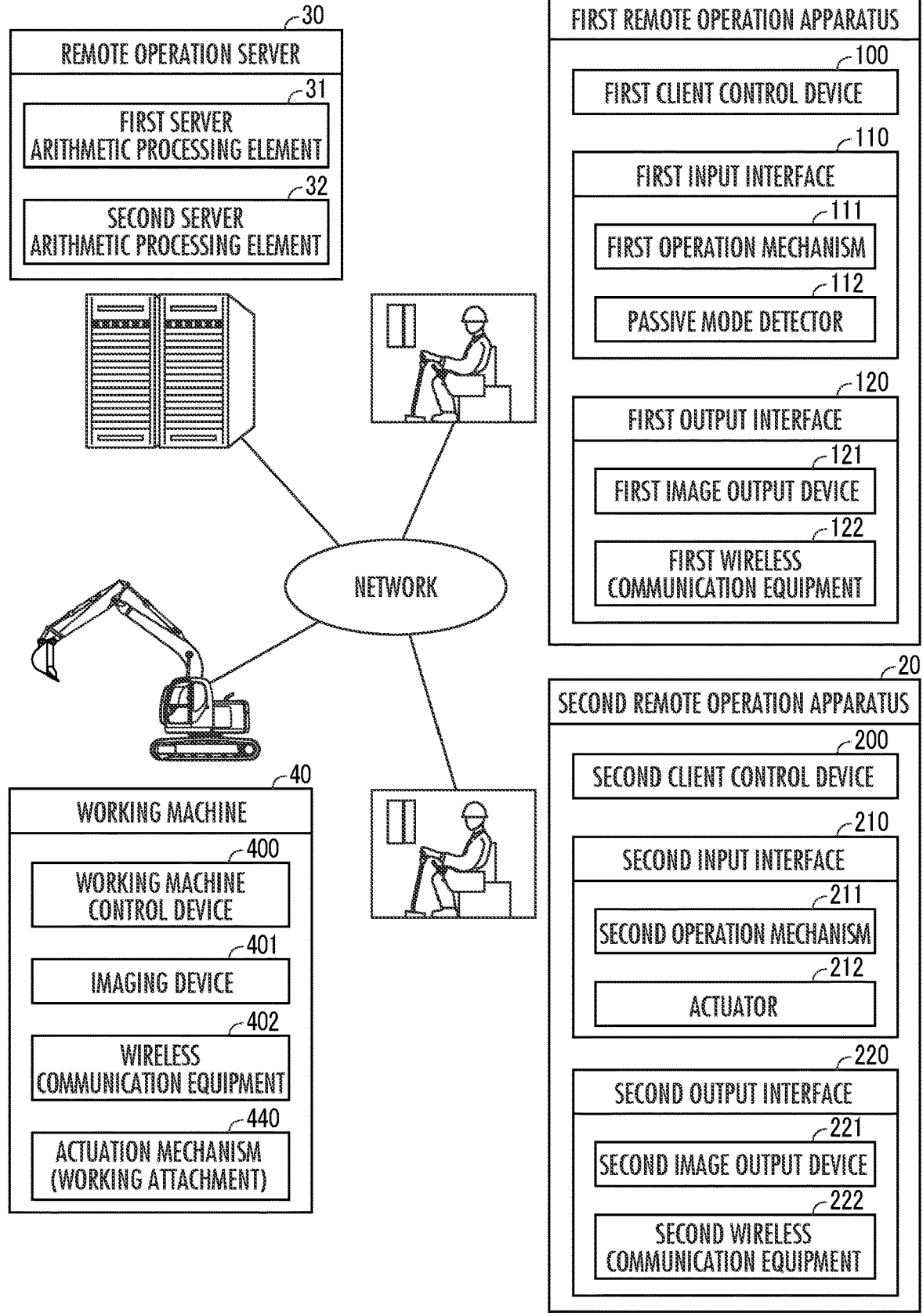
FIG. 7 is an explanatory view concerning a remote operation system as another embodiment of the present invention.

In the above embodiment, the first remote operation apparatus 10, the second remote operation apparatus 20 and the working machine 40 directly intercommunicate in accordance with a wireless communication system, and as another embodiment, the first remote operation apparatus 10, the second remote operation apparatus 20 and the working machine 40 may indirectly intercommunicate via a remote operation server 30 shown in FIG. 7.

The remote operation server 30 comprises a first server arithmetic processing element 31 and a second server arithmetic processing element 32. The first server arithmetic processing element 31 receives, from the first remote operation apparatus 10, operational mode data corresponding to a passive mode of the first operation mechanism 111 which is detected in the first remote operation apparatus 10. The second server arithmetic processing element 32 transmits the operational mode data to the second remote operation apparatus 20, to display an operational mode image in the second image output device 221 (see FIG. 6A and FIG. 6B).

REFERENCE SIGNS LIST 10 first remote operation apparatus
20 second remote operation apparatus
30 remote operation server
31 first server arithmetic processing element
32 second server arithmetic processing element
40 working machine
100 first client control device
110 first input interface
111 first operation mechanism
112 passive mode detector
120 first output interface
121 first image output device
122 first wireless communication equipment
200 second client control device
210 second input interface
211 second operation mechanism
212 actuator
220 second output interface
221 second image output device
222 second wireless communication equipment
401 imaging device (an outer imaging device)
402 wireless communication equipment
440 working attachment (an actuation mechanism)
1121 imaging unit (an inner imaging device)

The invention claimed is:

1. A remote operation system comprising:
a working machine including an actuation lever and an imaging device which images an environment including at least a part of the actuation lever; and
a first remote operation apparatus and a second remote operation apparatus each including an operation lever configured to perform a remote operation of the working machine, an image output device which displays an environmental image corresponding to captured image data acquired by the imaging device of the working machine, and one or more processors configured to execute computer-executable instructions stored in a memory, wherein
the one or more processors of the first remote operation apparatus execute the computer executable instructions to cause the first remote operation apparatus to act as a passive mode detector which detects a passive mode of the operation lever in the first remote operation apparatus, and a first client control device which transmits operational mode data corresponding to the passive mode of the operation lever in the first remote operation apparatus which is detected by the passive mode detector, and
the second remote operation apparatus further comprises an actuator configured to actively operate the operation lever in the second remote operation apparatus, and wherein one or more processors of the second remote operation apparatus execute the computer executable instructions to cause the second remote operation apparatus to act as a second client control device which receives the operational mode data, and controls an operation of the actuator in accordance with the passive mode of the operation lever in the first remote operation apparatus in response to the operational mode data.

2. The remote operation system according to claim 1, wherein the first remote operation apparatus further comprising an inner imaging device which images an operational mode of the operation lever in the first remote operation apparatus by an operator, and the first client control device transmits captured image data acquired by the inner imaging device, and the second client control device receives the captured image data acquired from the inner imaging device, and controls the image output device to display an operational mode image representing the operational mode of the operation lever in the first remote operation apparatus by the operator in response to receiving the captured image data acquired from the inner imaging device.

3. The remote operation system according to claim 1, wherein the second client control device controls the image output device to display an operational mode image representing an operation amount of the operation lever in the first remote operation apparatus corresponding to the passive mode of the operation mechanism in the first remote operation apparatus in response to receiving the operational mode data.

4. A remote operation server comprising one or more processors that execute computer-executable instructions to perform an intercommunicating function with each of a first remote operation apparatus and a second remote operation apparatus each including an operation lever configured to perform a remote operation of a working machine including an actuation mechanism and an imaging device which images an environment including at least a part of the actuation mechanism, and an image output device which displays an environmental image corresponding to captured image data acquired by the imaging device of the working machine, the remote operation server comprising:

a first server control element which receives, from the first remote operation apparatus, operational mode data corresponding to a passive mode of the operation lever in the first remote operation apparatus which is detected in the first remote operation apparatus; and a second server control element which transmits the operational mode data to the second remote operation apparatus, to control an operation of an actuator configured to actively operate the operation lever in the second remote operation apparatus in accordance with the passive mode of the operation lever in the first remote operation apparatus in response to the operational mode data in the second remote operation apparatus.

* * * * *